(12) United States Patent
Lee et al.

(10) Patent No.: US 10,545,360 B2
(45) Date of Patent: Jan. 28, 2020

(54) LIQUID CRYSTAL MODULE ASSEMBLY AND DISPLAY DEVICE INCLUDING THE SAME

(71) Applicant: SAMSUNG ELECTRONICS CO., LTD., Suwon-si (KR)

(72) Inventors: Kyoung Youn Lee, Suwon-si (KR); Hyun Jun Jung, Yongin-si (KR); Dong-hyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/465,965

(22) Filed: Mar. 22, 2017

(65) Prior Publication Data

US 2017/0192293 A1 Jul. 6, 2017

Related U.S. Application Data

(63) Continuation of application No. 14/796,549, filed on Jul. 10, 2015, now Pat. No. 9,632,342, which is a
(Continued)

(30) Foreign Application Priority Data

Dec. 27, 2010 (KR) ........................ 10-2010-0135439

(51) Int. Cl.
*G02F 1/1333* (2006.01)
*G02F 1/1345* (2006.01)

(52) U.S. Cl.
CPC ...... *G02F 1/133308* (2013.01); *G02F 1/1345* (2013.01); *G02F 2001/13332* (2013.01); *G02F 2001/133314* (2013.01); *G02F 2001/133317* (2013.01); *G02F 2001/133325* (2013.01); *G02F 2201/46* (2013.01)

(58) Field of Classification Search
CPC ............ G02F 1/133308; G02F 1/1345; G02F 2001/133314
See application file for complete search history.

(56) References Cited

U.S. PATENT DOCUMENTS 6,020,867 A 2/2000 Shimada et al.
6,219,116 B1 4/2001 Yuuki et al.
(Continued)

FOREIGN PATENT DOCUMENTS

JP 2003302620 A 10/2003
JP 2009266195 A 11/2009
(Continued)

OTHER PUBLICATIONS

Communication dated Jul. 16, 2017, issued by the Korean Intellectual Property Office in corresponding Korean Application No. 10-2010-0135439.
(Continued)

*Primary Examiner* — Lucy P Chien
(74) *Attorney, Agent, or Firm* — Sughrue Mion, PLLC

(57) ABSTRACT

A display device includes a liquid crystal module to display an image at a front surface thereof, a cover to encase at least a portion of the liquid crystal module, and at least one fastening unit to couple the cover to the liquid crystal module, wherein the fastening unit is provided at a rear surface of the liquid crystal module.

21 Claims, 12 Drawing Sheets

Related U.S. Application Data continuation of application No. 13/337,415, filed on Dec. 27, 2011, now Pat. No. 9,097,923.

(56) References Cited

U.S. PATENT DOCUMENTS

| | | | |
|---|---|---|---|
| 6,532,152 B1 | 3/2003 | White et al. | |
| 2001/0019377 A1* | 9/2001 | Fukayama | G02F 1/133308 349/58 |
| 2003/0122992 A1* | 7/2003 | Hayashimoto | G02F 1/133308 349/58 |
| 2008/0238273 A1 | 10/2008 | Lee et al. | |
| 2009/0231506 A1 | 9/2009 | Takata | |

FOREIGN PATENT DOCUMENTS

| | | |
|---|---|---|
| KR | 10-2006-0081221 A | 7/2006 |
| KR | 1020080088088 A | 10/2008 |

OTHER PUBLICATIONS

Communication dated Jan. 18, 2017, issued by the Korean Intellectual Property Office in counterpart Korean Application No. 10-2010-0135439.

Communication issued by the Korean Intellectual Property Office dated Jan. 26, 2018 in counterpart Korean Patent Application No. 10-2010-0135439.

Communication issued by the Korean Intellectual Property Office dated Mar. 22, 2018 in counterpart Korean Patent Application No. 10-2010-0135439.

* cited by examiner

LIQUID CRYSTAL MODULE ASSEMBLY AND DISPLAY DEVICE INCLUDING THE SAME

CROSS-REFERENCE TO RELATED APPLICATION

This application is a Continuation Application of U.S. application Ser. No. 14/796,549 filed on Jul. 10, 2015, which is a Continuation Application of U.S. application Ser. No. 13/337,415 filed on Dec. 27, 2011 in the United States Patent and Trademark Office which claims the priority from Korean Patent Application No. 10-2010-0135439 filed on Dec. 27, 2010 in the Korean Intellectual Property Office, the disclosures of which are hereby incorporated by reference in their entireties.

BACKGROUND

1. Field

Embodiments of the present inventive concept relate to a display device which has an improved structure of a cover coupled to a liquid crystal module and an improved structure of a stand.

2. Description of the Related Art

A display device is necessarily used to implement a compact lightweight system, for example, a notebook computer, a portable computer or a mobile phone such as a personal digital assistant (PDA) or the like, in addition to being used as a monitor of a desktop computer.

Examples of such a display device include a Liquid Crystal Display (LCD), Plasma Display Panel (PDP), Field Emission Display (FED), etc. This device has better visibility than a Cathode-Ray Tube (CRT), less average power consumption, and a lower heat value than the CRT of the same image size. Therefore, such display devices are being used for applications such as a monitor of a mobile phone, computer, television, or the like.

SUMMARY

An aspect of the exemplary embodiments is to provide a display device in which a cover may be easily assembled to a liquid crystal module.

Another aspect of the exemplary embodiments is to provide a display device in which a stand may be easily assembled to a liquid crystal module.

Additional aspects of the exemplary embodiments will be set forth in part in the description which follows and, in part, will be obvious from the description, or may be learned by practice of the inventive concept.

In accordance with one aspect of an exemplary embodiment, a display device includes a liquid crystal module to display an image at a front surface thereof, a cover to encase at least a portion of the liquid crystal module, and at least one fastening unit to couple the cover to the liquid crystal module, wherein the fastening unit is provided at a rear surface of the liquid crystal module.

The fastening unit may couple the cover and the rear surface of the liquid crystal module.

The fastening unit may couple the cover and the rear surface of the liquid crystal module with a screw-type fastener.

The fastening unit may include a first fastening portion provided at the rear surface of the liquid crystal module, a second fastening portion provided at the cover, and a fastening screw coupled with the first fastening portion through the second fastening portion.

The fastening unit may couple the cover and the rear surface of the liquid crystal module with a hook-type fastener.

The fastening unit may include a first fastening portion provided at the rear surface of the liquid crystal module having a first hook structure, and a second fastening portion provided at the cover having a second hook structure corresponding to the first hook structure.

The cover may include a first cover to encase a frame area of the rear surface of the liquid crystal module, and a second cover to encase a central area of the rear surface of the liquid crystal module.

The first cover may include a frame portion provided at a position adjacent to a frame of the rear surface of the liquid crystal module, and a side surface portion provided at a position adjacent to a side surface of the liquid crystal module.

The side surface portion may include a front end located adjacent to an edge of the front surface of the liquid crystal module and a rear end located adjacent to an edge of the rear surface of the liquid crystal module, and the front end may be formed to have a smaller thickness than a thickness of the rear end.

The first cover may be made of a plastic material, whereas the second cover may be made of a metal material.

The first cover may be formed with a mounting position guide portion to guide a mounting position of the second cover.

The mounting position guide portion may include a first mounting position guide portion to support a base surface of the second cover, and a second mounting position guide portion to support an upper surface of the second cover.

The second cover may be formed with a vent hole to pass air.

The display device may further include a bracket coupled to the rear surface of the liquid crystal module, and a stand coupled with the bracket to support the liquid crystal module.

The display device may further include a stand guide unit to guide a mounting position of the stand.

The stand guide unit may include a first stand guide portion provided at the bracket, a second stand guide portion provided at the cover, and a third stand guide portion provided at the stand.

The display device may further include a stand fastening unit to couple the stand to the bracket.

The stand fastening unit may include a first stand fastening portion provided at the bracket, a second stand fastening portion provided at the cover, and a third stand fastening portion provided at the stand.

The liquid crystal module may include a liquid crystal panel, a backlight unit to supply the liquid crystal panel with light, and a bottom chassis and a top chassis to support the liquid crystal panel and the backlight unit.

In accordance with another aspect of an exemplary embodiment, a display device includes a liquid crystal panel, a backlight unit to supply the liquid crystal panel with light, a chassis having an upper surface, a side wall, and a base surface to support the liquid crystal panel and the backlight unit, and a cover to encase at least a portion of the chassis, wherein the cover is coupled with the base surface of the chassis.

The display device may further include at least one fastening unit to couple the cover and the base surface of the chassis.

The cover may include a first cover provided at a frame area of the base surface of the chassis, and a second cover provided at a central area of the chassis.

In accordance with a further aspect of an exemplary embodiment, a liquid crystal module assembly includes a liquid crystal module having a front surface, a side surface, and a rear surface, a cover to encase the side surface and the rear surface of the liquid crystal module, and at least one fastening unit to couple the cover with the rear surface of the liquid crystal module so that the cover is supported at the liquid crystal module.

BRIEF DESCRIPTION OF THE DRAWINGS

These and/or other aspects of the exemplary embodiments will become apparent and more readily appreciated from the following description of the embodiments, taken in conjunction with the accompanying drawings of which.

DETAILED DESCRIPTION

Figure 1:
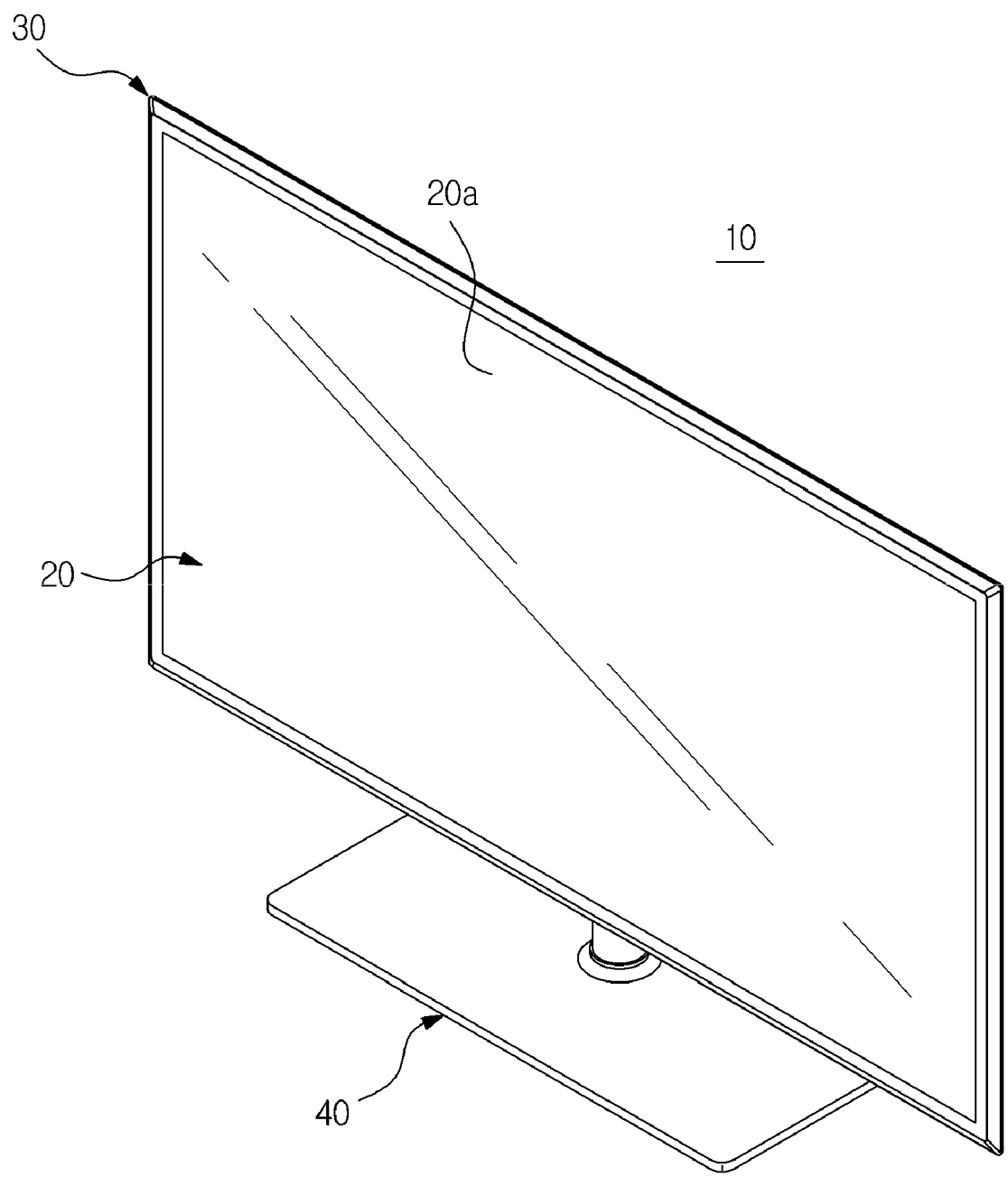
FIG. 1 is a front perspective view illustrating a display device according to an exemplary embodiment.

Reference will now be made in detail to the exemplary embodiments of the inventive concept, examples of which are illustrated in the accompanying drawings, wherein like reference numerals refer to like elements throughout.

Figure 2:
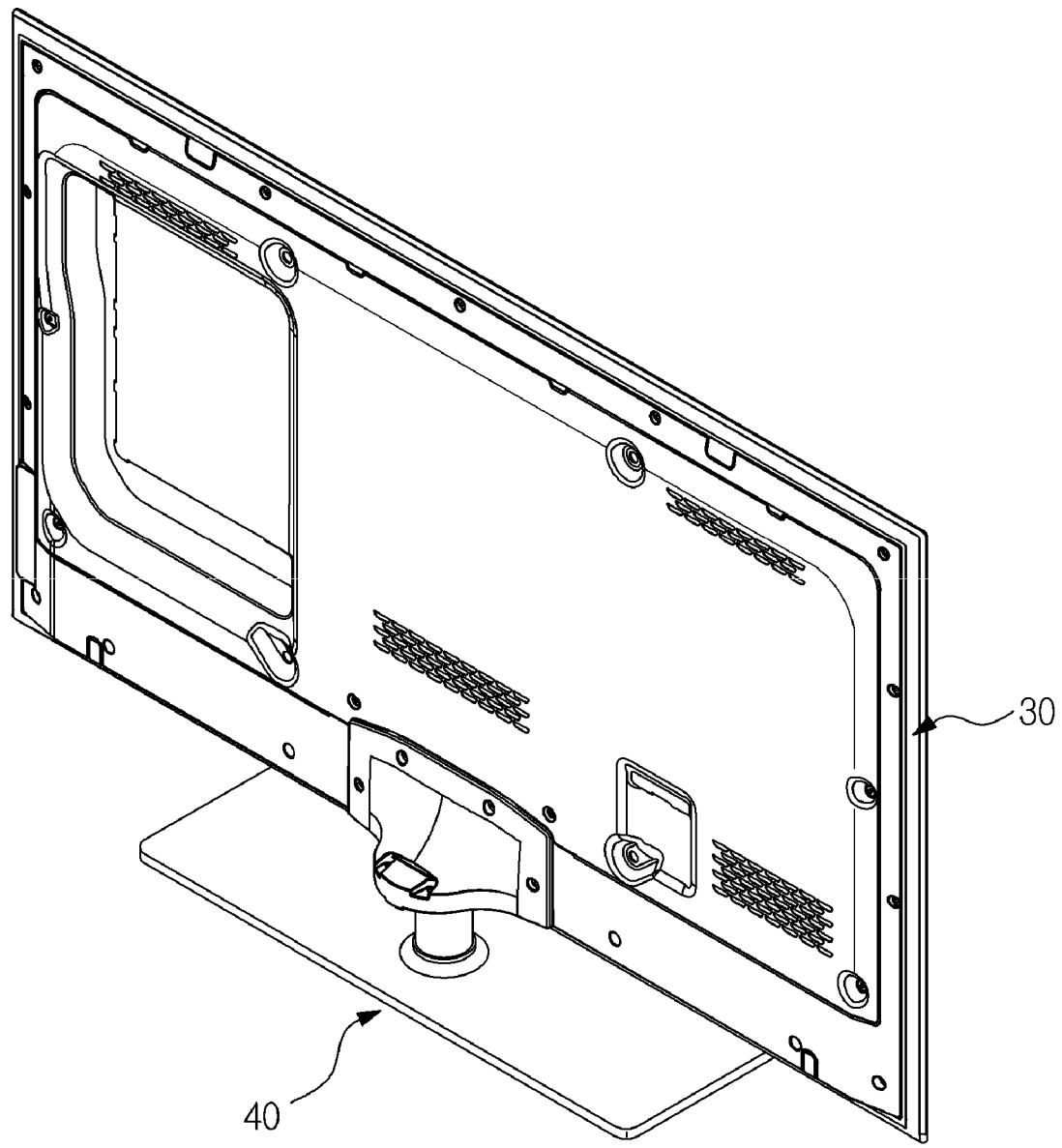
FIG. 2 is a rear perspective view illustrating the display device according to the exemplary embodiment.
Figure 3:
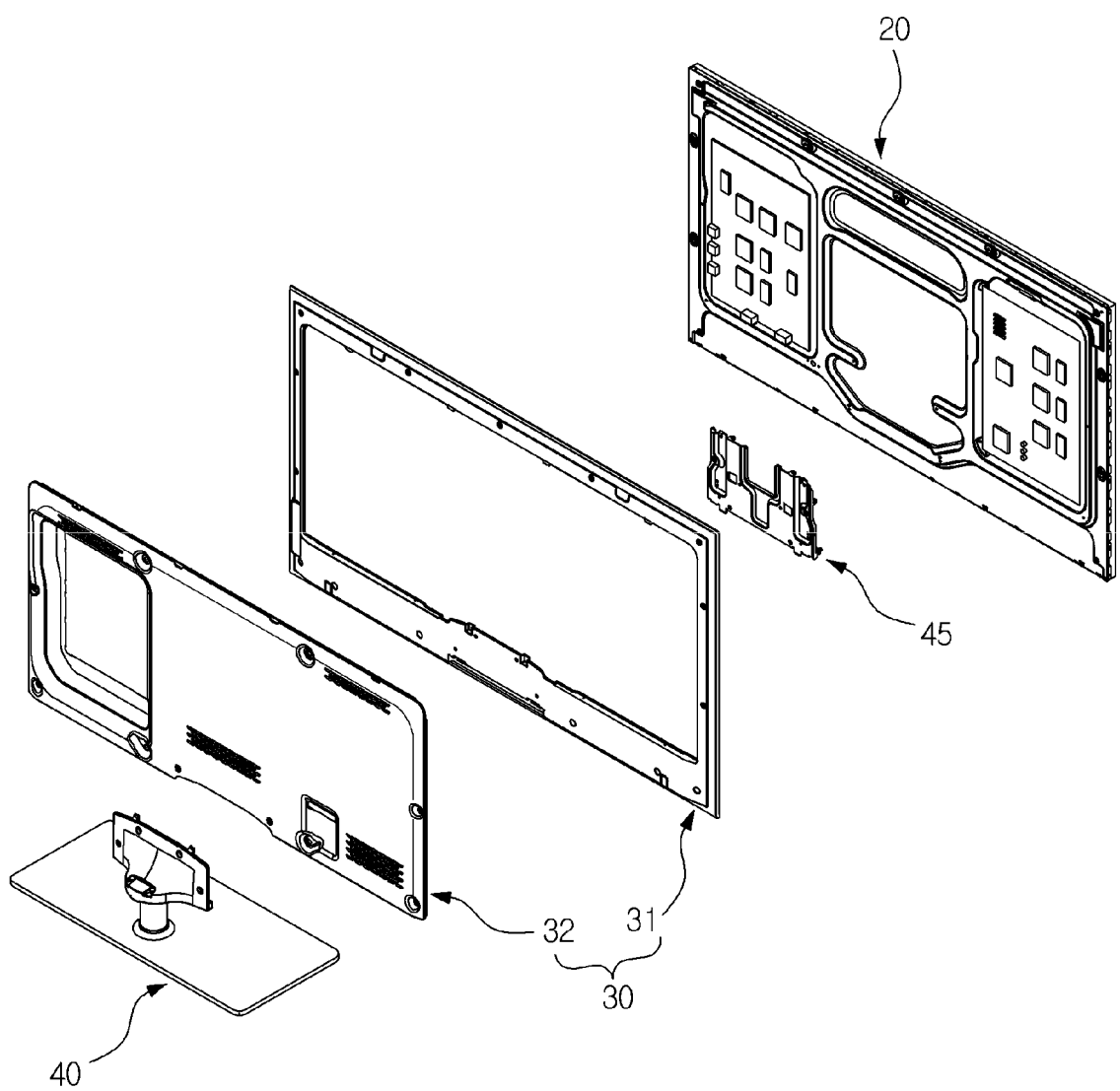
FIG. 3 is an exploded perspective view illustrating the display device according to the exemplary embodiment.
Figure 4:
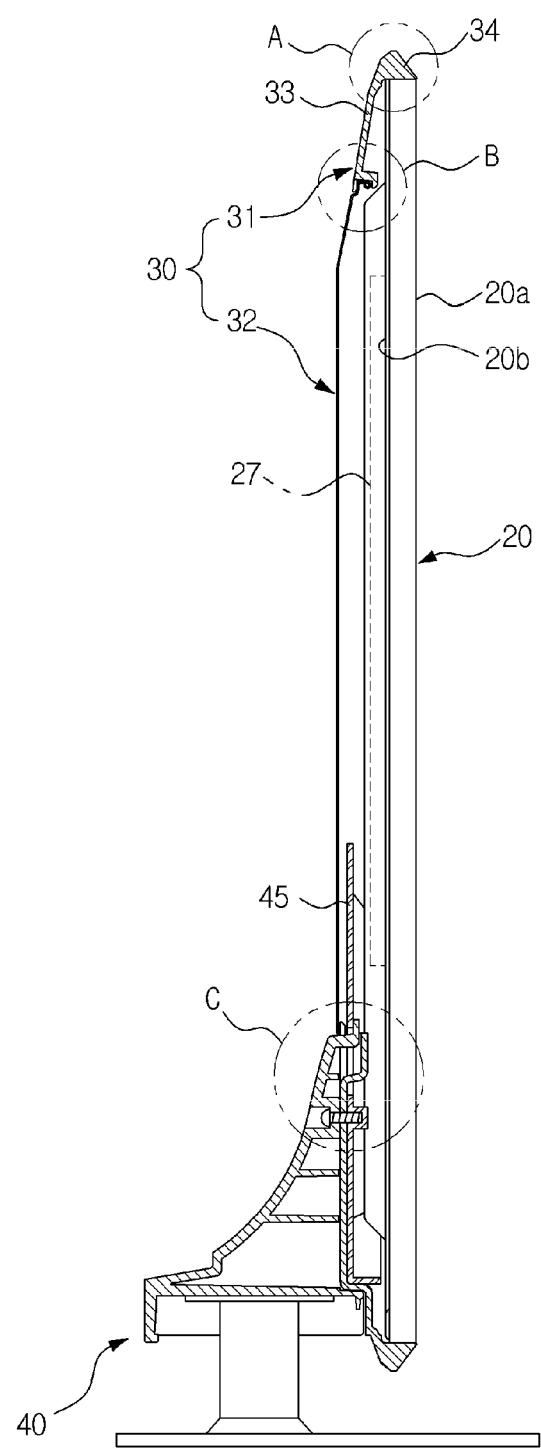
FIG. 4 is a sectional view illustrating a main configuration of the display device according to the exemplary embodiment.

FIG. 1 is a front perspective view illustrating a display device according to an exemplary embodiment. FIG. 2 is a rear perspective view illustrating the display device according to the exemplary embodiment. FIG. 3 is an exploded perspective view illustrating the display device according to the exemplary embodiment. FIG. 4 is a sectional view illustrating a main configuration of the display device according to the exemplary embodiment.

As shown in FIGS. 1 to 4, the display device, which is designated by reference numeral 10, may include a liquid crystal module 20, a cover 30, and a stand 40.

The liquid crystal module 20 displays an image through a front surface 20a thereof. The cover 30 is installed to encase at least a portion of the liquid crystal module 20 so as to protect electric components within the display device 10. Hereinafter, a configuration that the cover 30 is mounted to the liquid crystal module 20 is referred to as a liquid crystal module assembly 11. The liquid crystal module assembly 11 may be fixed to a wall surface through a wire hook (not shown), or may be erected on a floor through the stand 40. Hereinafter, the display device 10 supported by the stand 40 will be described with reference to the illustrations.

Figure 5:
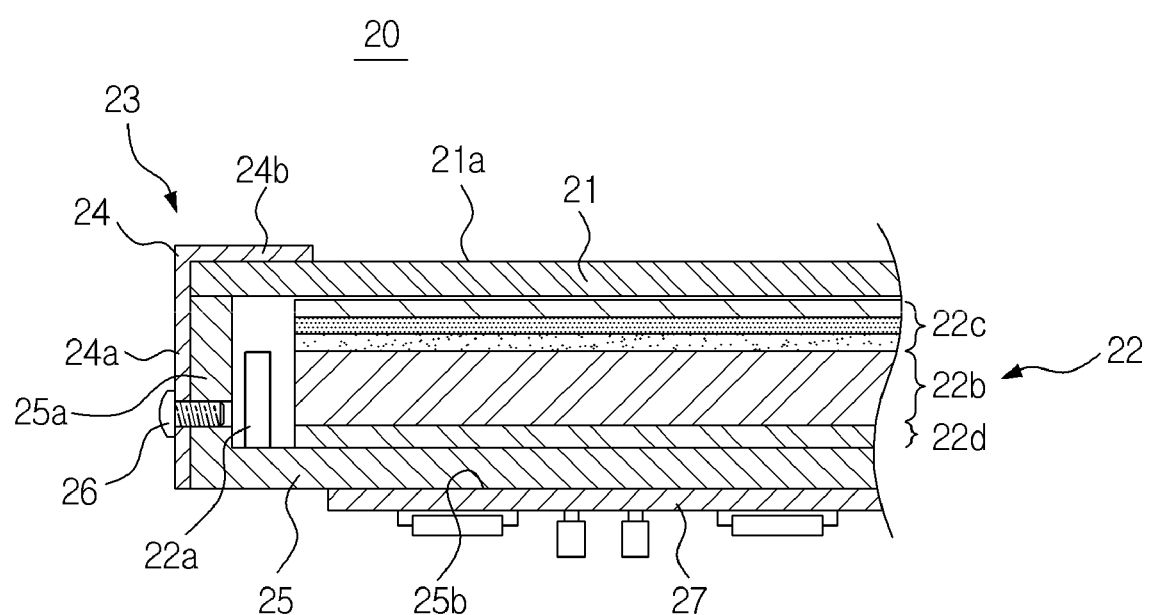
FIG. 5 is a sectional view illustrating a main configuration of a liquid crystal module according to the exemplary embodiment.

FIG. 5 is a sectional view illustrating a main configuration of the liquid crystal module according to the exemplary embodiment.

As shown in FIGS. 1 to 5, the liquid crystal module 20 may include a liquid crystal panel 21, a backlight unit 22, and a chassis 23.

The liquid crystal panel 21 may correspond to a display portion of the display device 10.

The image may be formed in such a manner as to typically put a liquid crystal in a narrow gap between two sheets of thin glass substrate and to change a molecular array direction by application of voltage to the liquid crystal through a transparent electrode so as to pass or reflect light. Here, a front surface 21a of the liquid crystal panel 21 corresponds to the front surface 20a of the liquid crystal module 20.

The backlight unit 22 may supply light to the liquid crystal panel 21. The backlight unit 22 may include a light source 22a, a light guide plate 22b, optical sheets 22c, and a reflection sheet 22d. Light emitted from the light source 22a enters a side surface of the light guide plate 22b. Light directed downwards by total reflection from the light guide plate 22b is reflected again by the reflection sheet 22d and then enters the light guide plate 22b. Light directed upwards from the light guide plate 22b enters the liquid crystal panel 21 via the optical sheets 22c.

The chassis 23 may be a structure to accommodate and support the liquid crystal panel 21 and the backlight unit 22 therewithin. The chassis 23 may include a top chassis 24 and a bottom chassis 25. Side walls 24a and 25a of the respective top and bottom chassis 24 and 25 are coupled to each other by a screw 26. The top chassis 24 supports, at an upper surface 24b thereof, an upper portion of the liquid crystal panel 21, whereas the bottom chassis 25 supports, at a base surface 25b thereof, a lower portion of the backlight unit 22. Also, the bottom chassis 25 is mounted, at the base surface 25b thereof, with the electric components 27 such as a circuit board, a speaker, or the like.

Figure 6:
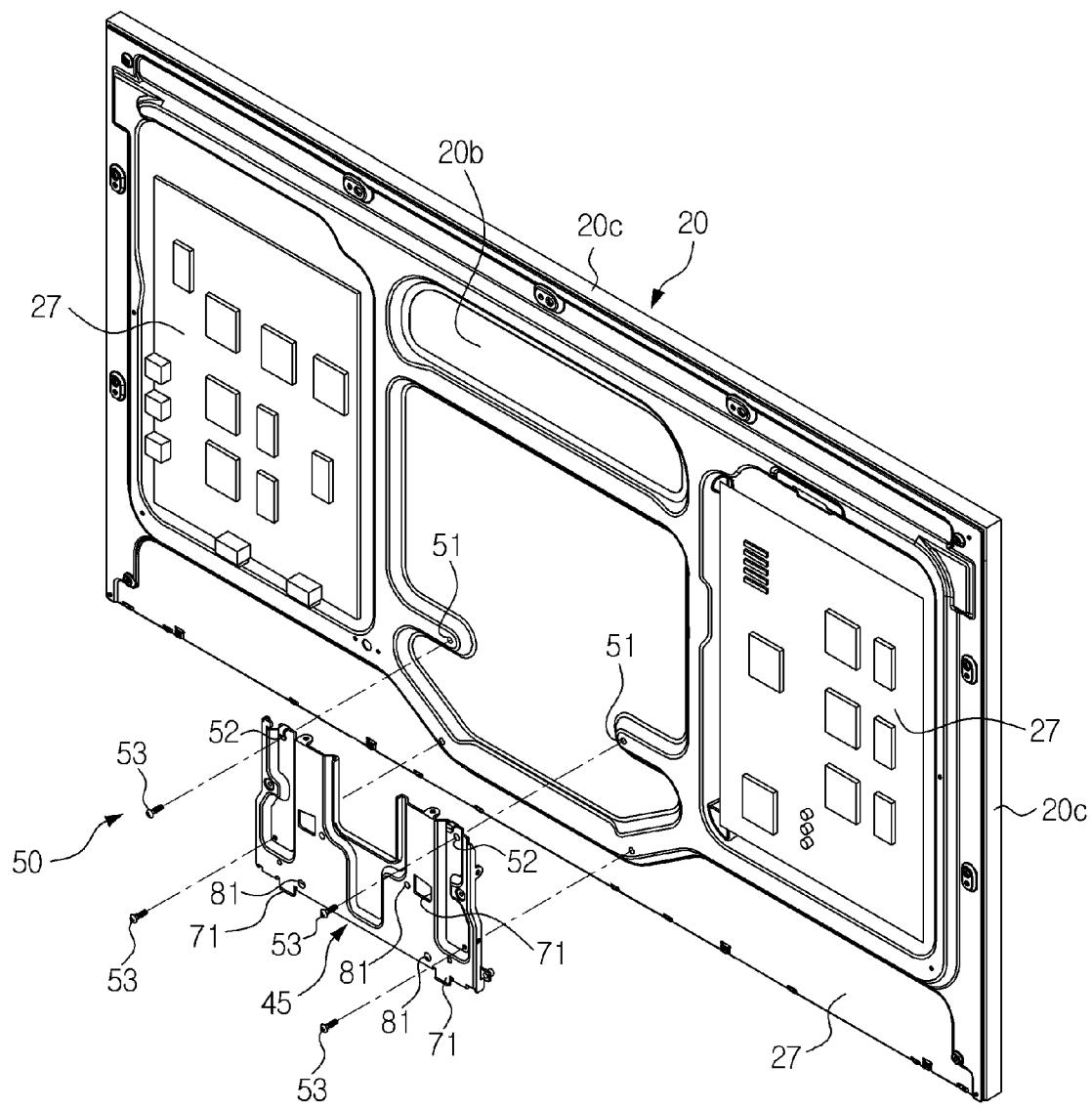
FIG. 6 is a view illustrating an appearance in which a bracket is coupled with the liquid crystal module according to the exemplary embodiment.

FIG. 6 is a view illustrating an appearance in which a bracket is coupled with the liquid crystal module according to the exemplary embodiment.

As shown in FIGS. 1 to 6, the bracket 45 may be coupled to a rear surface 20b of the liquid crystal module 20 by a plurality of bracket fastening units 50. Here, the rear surface 20b of the liquid crystal module 20 corresponds to the base surface 25b of the bottom chassis 25.

Each of the bracket fastening units 50 includes a first bracket fastening portion 51 provided at the rear surface 20b of the liquid crystal module 20, a second bracket fastening portion 52 provided at the bracket 45, and a bracket fastening screw 53 to couple the first bracket fastening portion 51 and the second bracket fastening portion 52. The bracket fastening screw 53 is coupled to the first bracket 51 through the second bracket fastening portion 52. Consequently, the bracket 45 may be coupled to the rear surface 20b of the liquid crystal module 20.

Furthermore, the bracket 45 may be coupled with the stand 40. The bracket 45 is formed with first stand guide portions 71 of a stand guide unit 70 and first stand fastening portions 81 of a stand fastening unit 80. Coupling of the bracket 45 and the stand 40 will be described below.

Meanwhile, the cover 30 is installed to encase at least a portion of the liquid crystal module 20 so as to protect the electric components 27 coupled to the rear surface 20b of the liquid crystal module 20. The cover 30 may include a first cover 31 and a second cover 32. The cover 30 may be coupled to the liquid crystal module 20 by at least one fastening unit 60.

Figure 7:
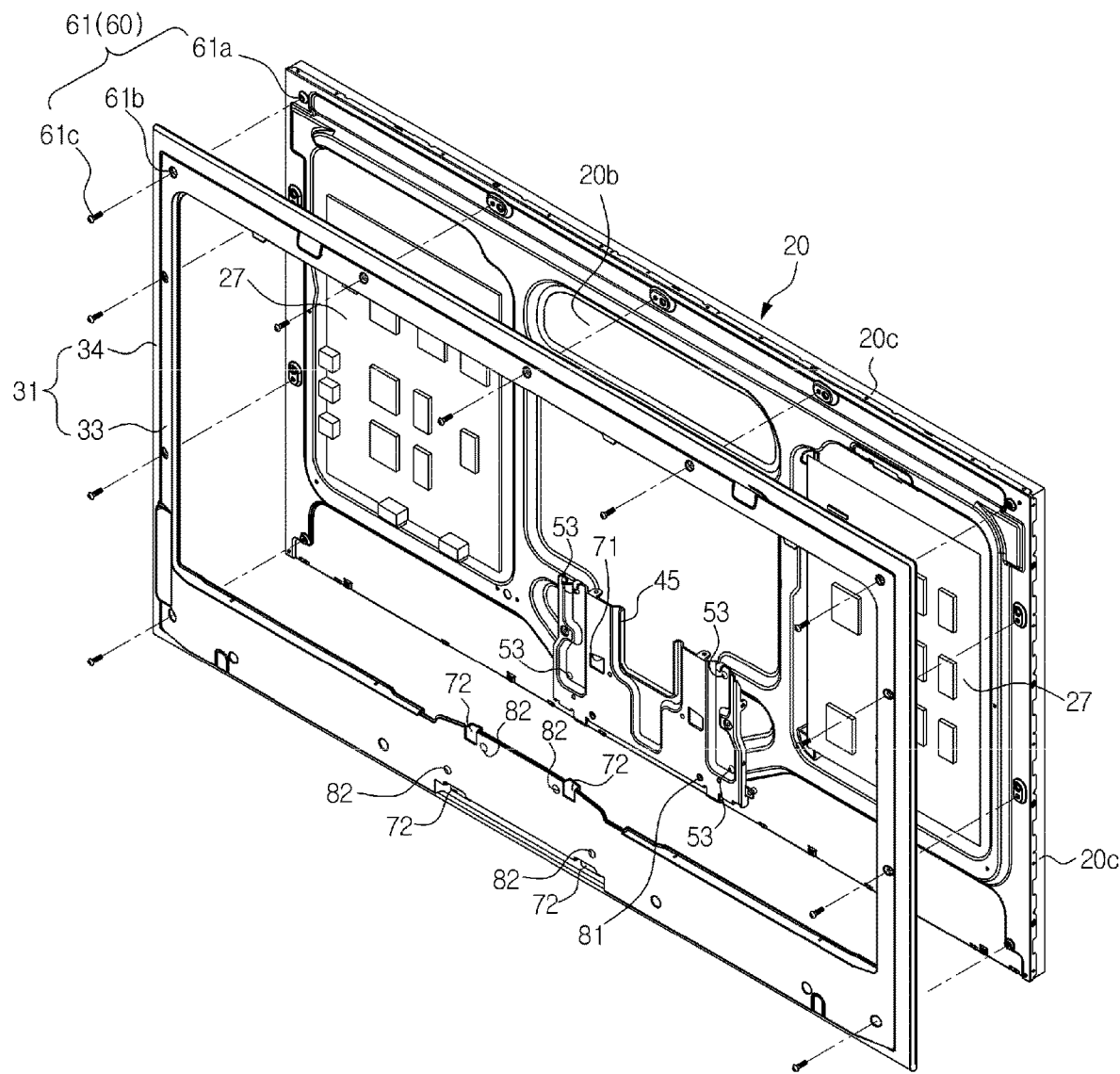
FIG. 7 is a view illustrating an appearance in which a first cover is coupled with the liquid crystal module according to the exemplary embodiment.
Figure 8:
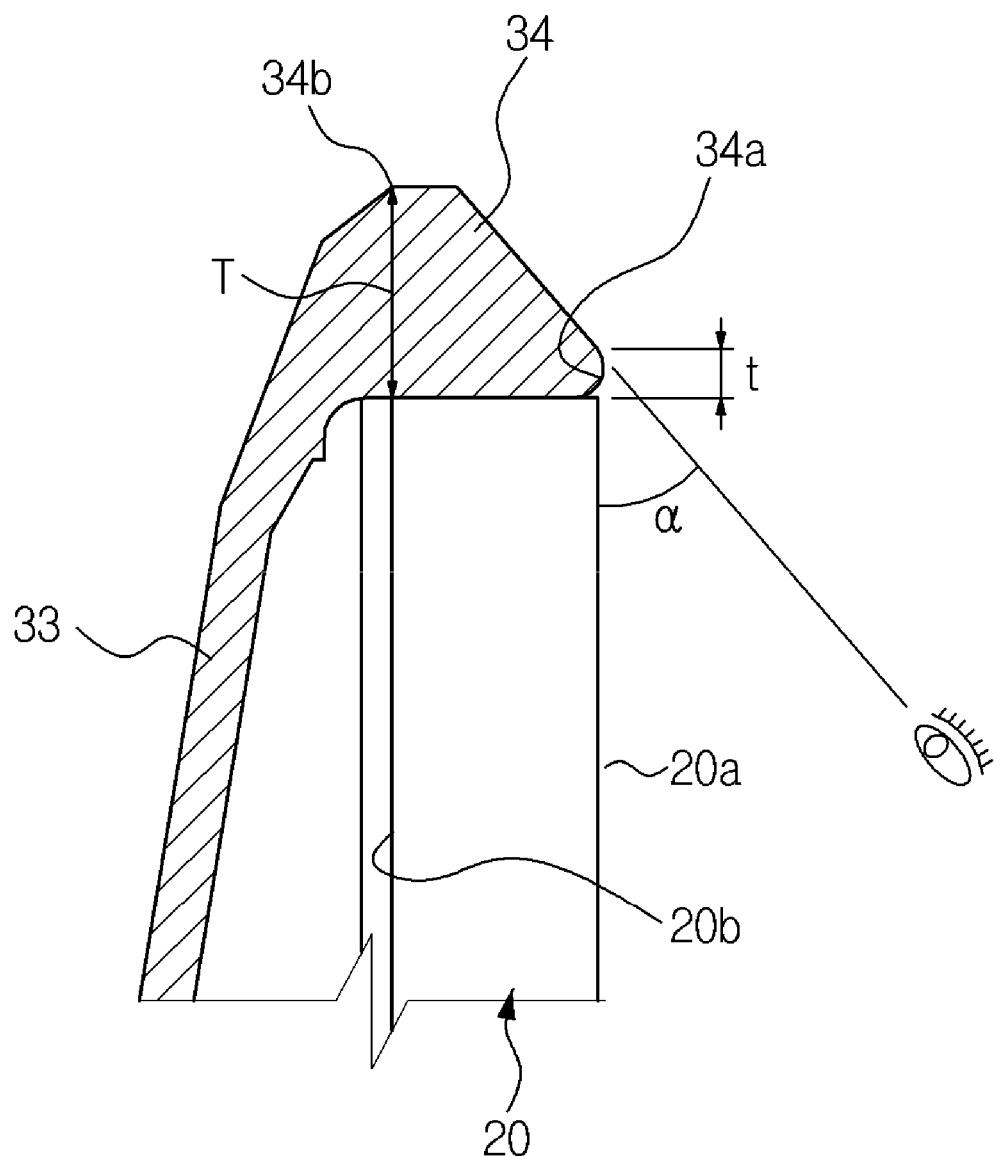
FIG. 8 is an enlarged view of portion 'A' shown in FIG. 4.

FIG. 7 is a view illustrating an appearance in which the first cover is coupled with the liquid crystal module according to the exemplary embodiment of the present invention. FIG. 8 is an enlarged view of portion 'A' shown in FIG. 4.

As shown in FIGS. 1 to 8, the first cover 31 is mounted at a frame area in the rear surface 20b of the liquid crystal module 20. In detail, the first cover 31 is mounted, at a frame portion 33 thereof, along a frame of the rear surface 20b of the liquid crystal module 20 while being mounted, at a side surface portion 34 thereof, along a side surface 20c of the liquid crystal module 20. Here, the rear surface 20b of the liquid crystal module 20 may correspond to the base surface 25b of the bottom chassis 25, whereas the side surface 20c of the liquid crystal module 20 may correspond to the side wall 25a of the bottom chassis 25 (or the side wall 24a of the top chassis 24). Meanwhile, the frame portion 33 and the side surface portion 34 of the first cover 31 may be formed by double injection molding. In particular, the first cover 31 is made of a plastic material. The frame portion 33 is made of a transparent material, whereas the side surface portion 34 is made of an opaque material.

The first cover 31 may be coupled with the rear surface 20b of the liquid crystal module 20 by at least one first fastening unit 61. The first fastening unit 61 may be comprised of a plurality of first fastening units. The at least one first fastening unit 61 may include a first fastening portion 61a provided at the rear surface 20b of the liquid crystal module 20, a second fastening portion 61b provided at the frame portion 33 of the first cover 31, and a first fastening screw 61c to couple the first fastening portion 61a and the second fastening portion 61b. The first fastening screw 61c is coupled to the first fastening portion 61a through the second fastening portion 61b. Consequently, the first cover 31 may be coupled to the rear surface 20b of the liquid crystal module 20. Therefore, the frame portion 33 of the first cover 31 encases the frame of the rear surface 20b of the liquid crystal module 20, whereas the side surface portion 34 of the first cover 31 encases the side surface 20c of the liquid crystal module 20.

In particular, the side surface portion 34 of the first cover 31 may include a front end 34a adjacent to an edge of the front surface 20a of the liquid crystal module 20 and a rear end 34b adjacent to an edge of the rear surface 20b of the liquid crystal module 20. In this case, the front end 34a is formed to have a smaller thickness t than the thickness T of the rear end 34b. That is, the front end 34a is formed to have a lower height t than the height T of the rear end 34b, as viewed from the side surface 20c of the liquid crystal module 20. Consequently, when the display device 10 is viewed from the front by equal to or less than a predetermined angle α which is an acute angle with respect to the liquid crystal module 20, the side surface portion 34 of the first cover 31 located at the side surface 20c of the liquid crystal module 20 may not be seen or be seen to a very slight extent. This has an effect of actual reduction in bezel size.

In addition, the first cover 31 is overlapped on the bracket 45. The first cover 31 is provided with second stand guide portions 72 at respective positions corresponding to the first stand guide portions 71 formed at the bracket 45. Also, the first cover 31 is provided with second stand fastening portions 82 at respective positions corresponding to the first stand fastening portions 81 formed at the bracket 45. The coupling of the bracket 45 and the stand 40 will be described below.

Meanwhile, in an alternative example of the present embodiment, the first fastening unit 61 may have a hook coupling structure. That is, the liquid crystal module 20 may be formed, at the rear surface 20b thereof, with a first hook structure, and the first cover 31 may be formed with a second hook structure corresponding to the first hook structure.

Figure 9:
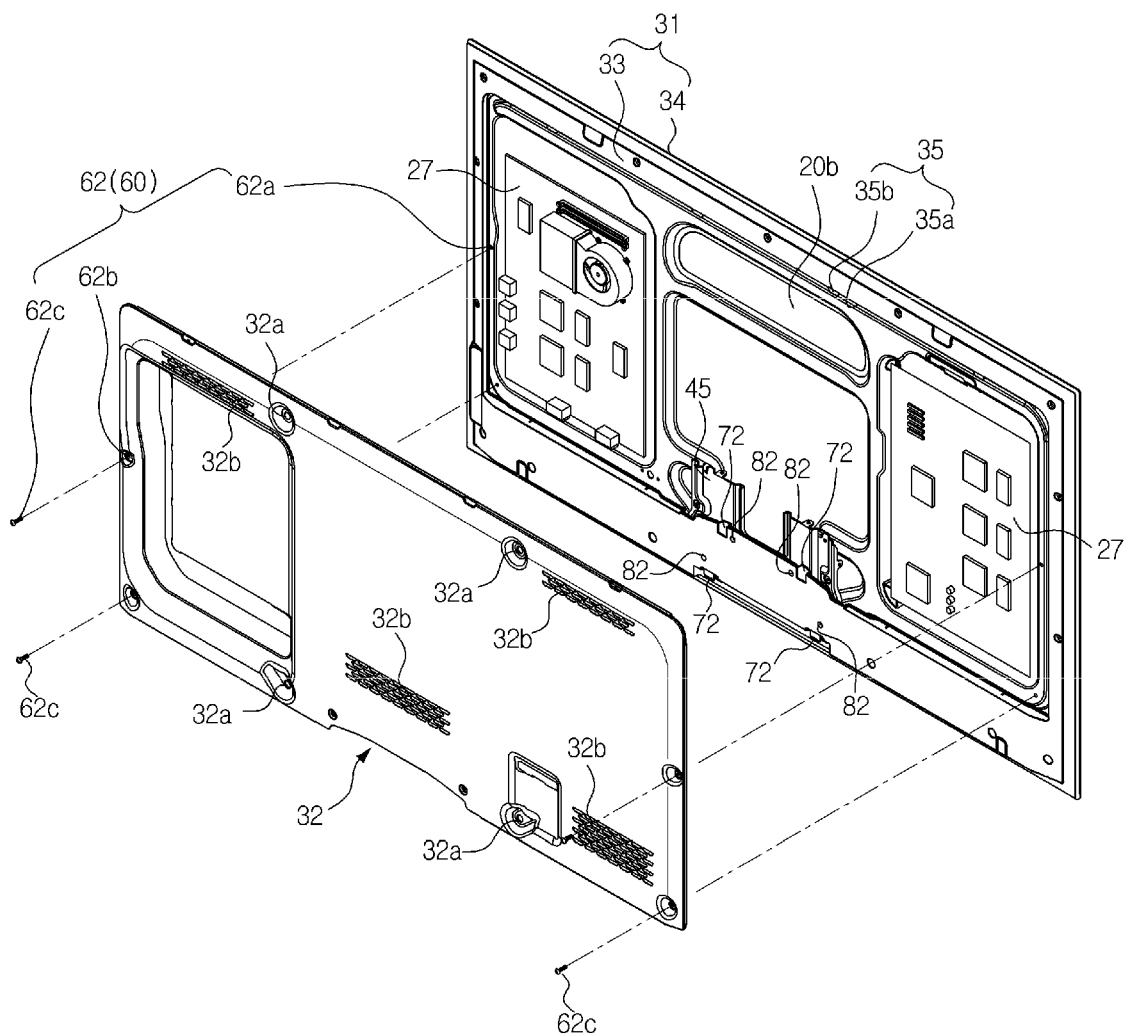
FIG. 9 is a view illustrating an appearance in which a second cover is coupled with the liquid crystal module according to the exemplary embodiment.
Figure 10:
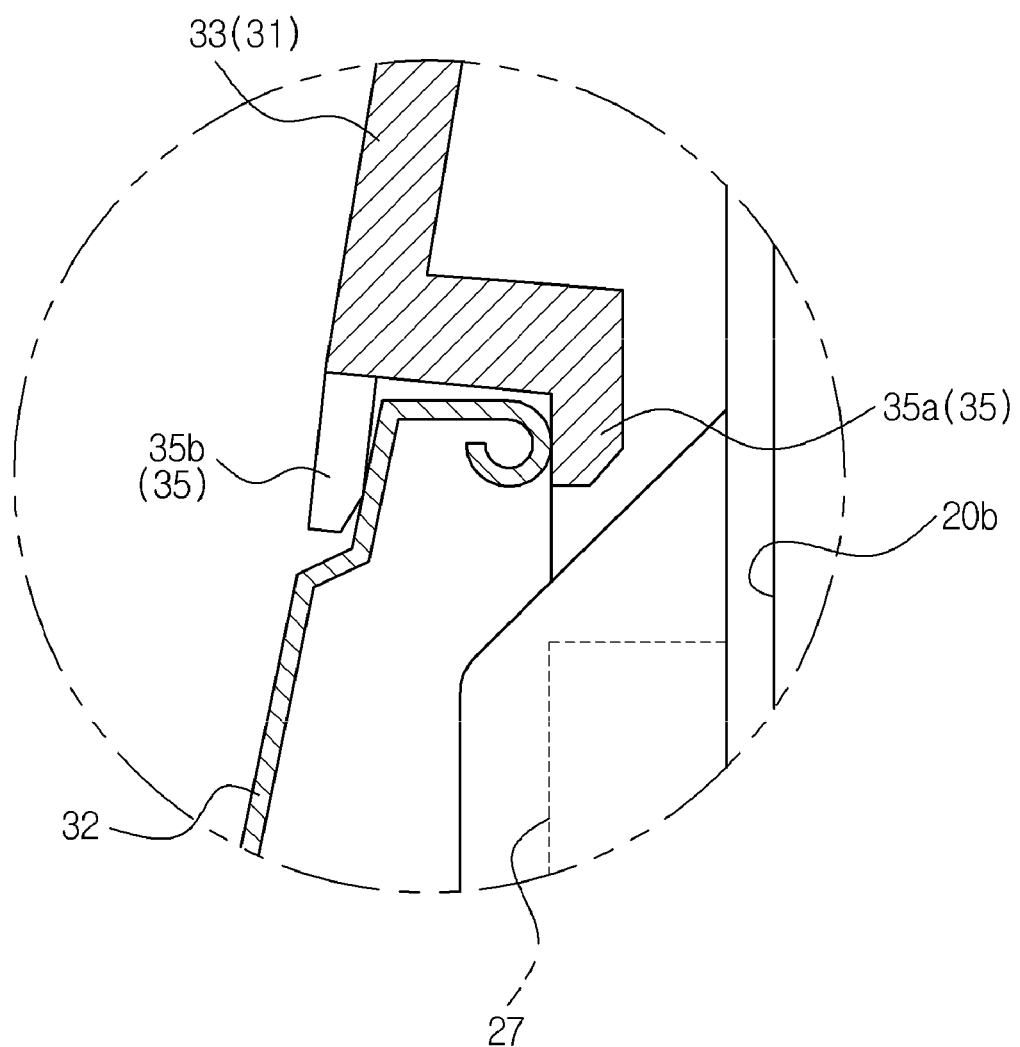
FIG. 10 is an enlarged view of portion 'B' shown in FIG. 4.

FIG. 9 is a view illustrating an appearance in which the second cover is coupled with the liquid crystal module according to the exemplary embodiment. FIG. 10 is an enlarged view of portion 'B' shown in FIG. 4.

As shown in FIGS. 1 to 11, the second cover 32 is mounted at a central area in the rear surface 20b of the liquid crystal module 20. The second cover 32 is individually separated from the first cover 31 so as to enable access to the rear surface 20b of the liquid crystal module 20. That is, a user may separate the second cover 32 and then have access to the electric components 27 mounted at the rear surface 20b of the liquid crystal module 20 to repair or replace the electric components 27.

The first cover 31 allows a mounting position of the second cover 32 to be determined. The second cover 32 is seated, at an outer frame thereof, to a mounting position guide portion 35 of the first cover 31. The mounting position guide portion 35 includes a first mounting position guide portion 35a to support a base surface of the second cover 32, and a second mounting position guide portion 35b to support an upper surface of the second cover 32. Consequently, the second cover 32 is primarily fixed to the first cover 31.

Furthermore, the second cover 32 may be coupled with the rear surface 20b of the liquid crystal module 20 by at least one second fastening unit 62. The second fastening unit 62 may be comprised of a plurality of second fastening units. The at least one second fastening unit 62 may include a first fastening portion 62a provided at the rear surface 20b of the liquid crystal module 20, a second fastening portion 62b provided at the second cover 32, and a second fastening screw 62c to couple the first fastening portion 62a and the second fastening portion 62b. The second fastening screw 62c is coupled to the first fastening portion 62a through the second fastening portion 62b. Consequently, the second cover 32 may be coupled to the rear surface 20b of the liquid crystal module 20 at the central area in the rear surface 20b of the liquid crystal module 20.

Meanwhile, the second cover 32 is formed with VESA (Video Electronics Standards Association) holes 32a so as to meet a VESA wall mount standard. The VESA holes 32a may be used to fix the liquid crystal module assembly 11 to the wall surface.

Also, the second cover 32 may be formed with a plurality of vent holes 32b. Heat generated from the electric components 27 may be emitted through the vent holes 32b. Furthermore, cold air is introduced through the vent holes 32b, thereby being capable of cooling the electric components 27. In particular, the second cover 32 may be made of a metal material or other material which improves cooling performance.

Meanwhile, in an alternative example of the present embodiment, the second fastening unit 62 may have a hook coupling structure. That is, the liquid crystal module 20 may be formed, at the rear surface 20b thereof, with a first hook structure, and the second cover 32 may be formed with a second hook structure corresponding to the first hook structure.

Figure 11:
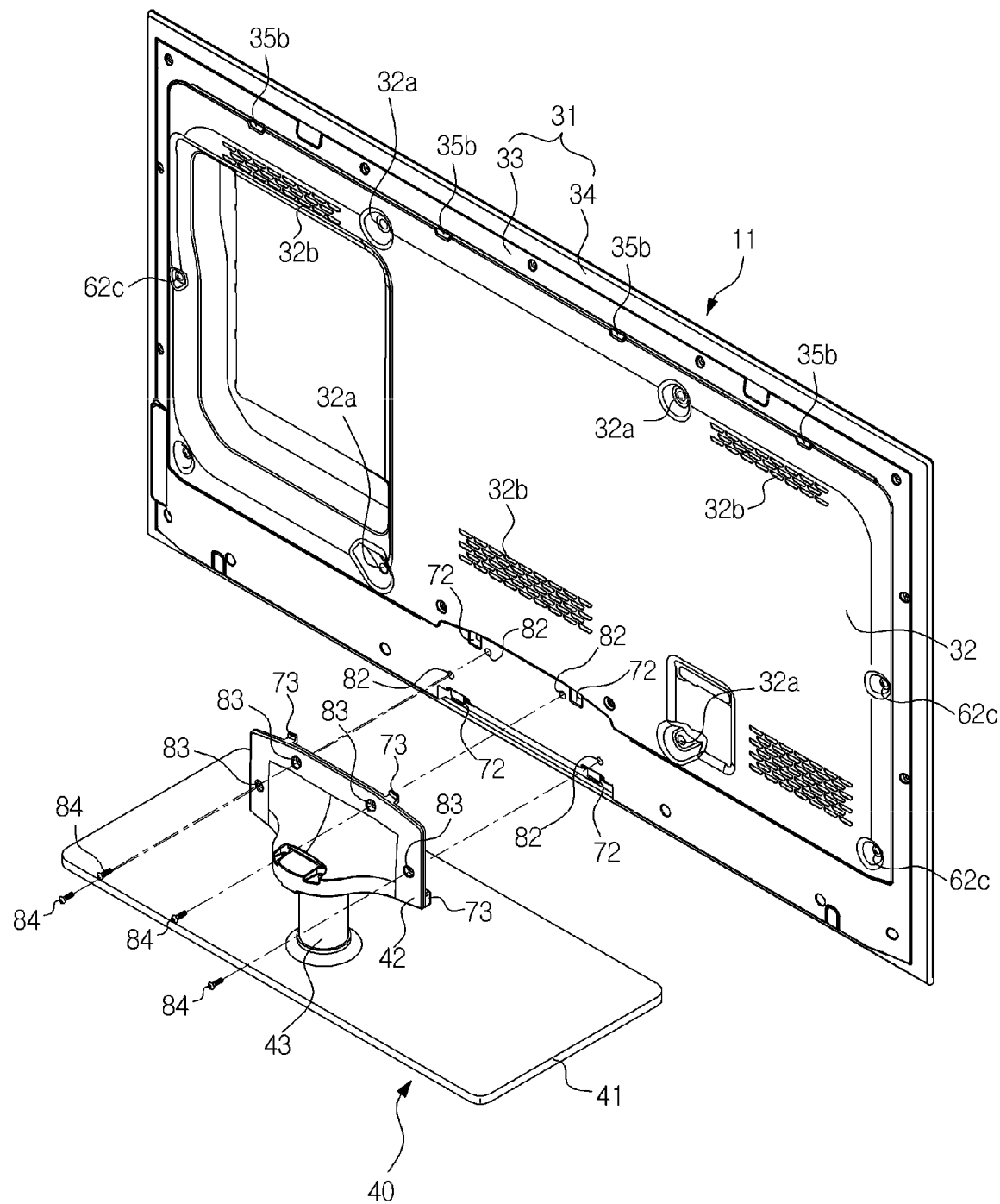
FIG. 11 is a view illustrating an appearance in which a stand is coupled to a rear surface of the liquid crystal module according to the exemplary embodiment.
Figure 12:
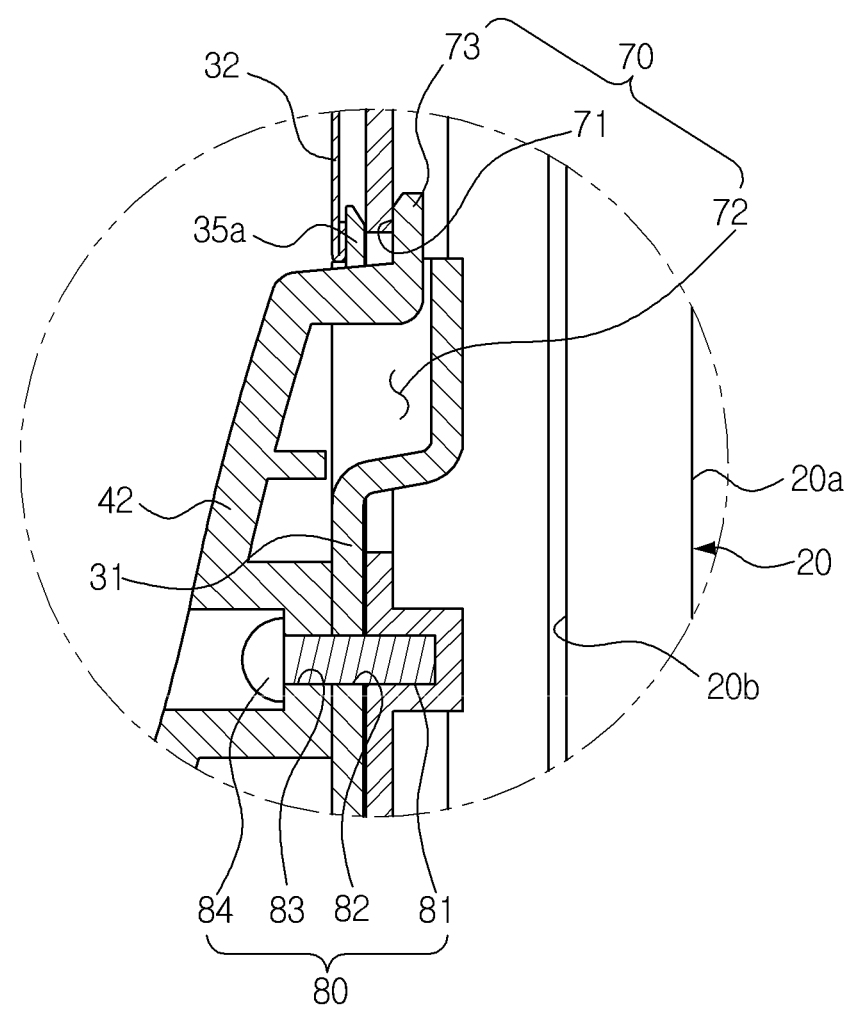
FIG. 12 is an enlarged view of portion 'C' shown in FIG. 4.

FIG. 11 is a view illustrating an appearance in which the stand is coupled to the rear surface of the liquid crystal module according to the exemplary embodiment. FIG. 12 is an enlarged view of portion 'C' shown in FIG. 4.

As shown in FIGS. 1 to 12, the stand 40 may include a lower pedestal 41, an upper pedestal 42, and a connection member 43 to connect the lower pedestal 41 and the upper pedestal 42. The lower pedestal 41 is laid on the floor, whereas the upper pedestal 42 is coupled with the liquid crystal module assembly 11. Here, the connection member 43 may be made of a transparent material.

The stand guide unit 70 allows a mounting position of the upper pedestal 42 to be guided at the rear surface 20b of the liquid crystal module 20. The stand guide unit 70 may include a plurality of first stand guide portions 71 provided at the bracket 45, a plurality of second stand guide portions 72 provided at the first cover 31, and a plurality of third stand guide portions 73 provided at the upper pedestal 42. Each of the third stand guide portions 73 is formed of a protrusion shape at the upper pedestal 42, whereas each of the first and second stand guide portions 71 and 72 is formed of a groove shape. Thus, the third stand guide portions 73 are inserted into the first stand guide portions 71 through the corresponding second stand guide portions 72, respectively. Consequently, the upper pedestal 42 may be primarily coupled with the bracket 45.

Subsequently, the upper pedestal 42 may be coupled to the rear surface 20b of the liquid crystal module 20 by the stand fastening unit 80. The stand fastening unit 80 may include a plurality of first stand fastening portions 81 provided at the bracket 45, a plurality of second stand fastening portions 82 provided at the first cover 31, a plurality of third stand fastening portions 83 provided at the upper pedestal 42, and a plurality of stand fastening screws 84 to couple the first stand fastening portions 81, the second stand fastening portions 82, and the third stand fastening portions 83. The stand fastening screws 84 are coupled with the first stand fastening portions 81 through the corresponding third and second stand fastening portions 83 and 82, respectively. Consequently, the upper pedestal 42 may be secondarily coupled with the bracket 45.

Thus, the stand 40 is firmly fixed to the liquid crystal module assembly 11 to support the liquid crystal module assembly 11. As a result, the display device 10 may be erected on the floor.

As is apparent from the above description, the liquid crystal module assembly and the display device may achieve reduction in the bezel size and simplification of an assembly process.

Although a few exemplary embodiments have been shown and described, it would be appreciated by those of skill in the art that changes may be made to these embodiments without departing from the principles and spirit of the inventive concept, the scope of which is defined in the claims and their equivalents.

What is claimed is:

1. A display device comprising:
a liquid crystal module configured to display an image at a front side thereof;
a non-metallic cover which forms a first portion of a rear exterior of the display device; and
a metallic cover coupled to the liquid crystal module, the metallic cover forming a second portion of the rear exterior of the display device; and
a bracket arranged between the liquid crystal module and the non-metallic cover and configured to be coupled to a stand,
wherein the non-metallic cover and the metallic cover are coupled to each other.

2. The display device of claim 1, wherein the non-metallic cover at least partially overlaps the metallic cover.

3. The display device of claim 1, wherein the non-metallic cover covers the bracket.

4. The display device of claim 1, wherein the liquid crystal module comprises:
a liquid crystal display panel; and
a backlight unit configured to supply light to the liquid crystal display panel.

5. The display device of claim 4, further comprising:
a chassis configured to support the liquid crystal display panel and the backlight unit.

6. The display device of claim 1, wherein the bracket is provided at a lower portion of the display device.

7. The display device of claim 1, wherein the non-metallic cover is provided at a lower region of the rear exterior of the display device.

8. The display device of claim 1, wherein the metallic cover is provided at an upper region of the rear exterior of the display device.

9. The display device of claim 1, wherein the metallic cover forms a part of the rear exterior of the display device and the non-metallic cover forms a remaining part of the rear exterior of the display device.

10. The display device of claim 1, wherein the stand is configured to support the display device.

11. The display device of claim 1, wherein the bracket is provided with a first stand fastening portion,
the non-metallic cover is provided with a second stand fastening portion, and
a stand fastening screw is coupled with the first stand fastening portion through the second stand fastening portion.

12. The display device of claim 1, wherein the metallic cover is coupled to the liquid crystal module via at least one fastening unit.

13. The display device of claim 1, wherein the non-metallic cover and the metallic cover are coupled to each other at least in a portion of the rear exterior in which the non-metallic cover and the metallic cover overlap.

14. A display device comprising:
a display panel module configured to display an image at a front side thereof; and
a rear exterior provided at a rear side of the display device that is opposite to the front side in a depth direction of the display device, the rear exterior comprising:
a non-metallic cover which forms at least a lower portion of the rear exterior, a surface of the lower portion extending to correspond to a dimension of the display panel module along a first direction of the display panel module, and
a metallic cover which forms an upper portion of the rear exterior, a surface of the upper portion extending to correspond to the dimension of the display panel module along the first direction, wherein the first direction is orthogonal to the depth direction.

15. The display device of claim 14, wherein the surface of the non-metallic cover and the surface of the metallic cover adjacently extend in the first direction and are aligned in a second direction perpendicular to the first direction, to form the rear exterior.

16. The display device of claim 14, wherein the surface of the non-metallic cover adjacently extends in parallel to the surface of the metallic cover underneath the display panel module in the first direction, to form the rear exterior.

17. The display device of claim 14, further comprising:
a bracket disposed between the non-metallic cover and the display panel module and configured to be coupled to a stand.

18. The display device of claim 14, wherein the non-metallic cover at least partially overlaps the metallic cover.

19. The display device of claim 18, wherein at least one fastener is used to couple an overlapped portion of the non-metallic cover and an overlapped portion of the metallic cover.

20. The display device of claim 14, wherein the non-metallic cover comprises an inclined portion inclined from an edge portion of the non-metallic cover toward the metallic cover.

21. The display device of claim 14, wherein the non-metallic cover is provided at an outer region of the metallic cover, and
the metallic cover is coupled to the display panel module.

* * * * *